No. 693,001. Patented Feb. 11, 1902.
J. W. FREES.
PRIMARY BATTERY.
(Application filed May 15, 1901.)
(No Model.)

Witnesses
Florence Kelly
Katharine Kelly

John W. Frees,
Inventor
By Attorney

UNITED STATES PATENT OFFICE.

JOHN W. FREES, OF READING, PENNSYLVANIA.

PRIMARY BATTERY.

SPECIFICATION forming part of Letters Patent No. 693,001, dated February 11, 1902.

Application filed May 15, 1901. Serial No. 60,272. (No model.)

*To all whom it may concern:*

Be it known that I, JOHN W. FREES, a citizen of the United States, residing at Reading, in the county of Berks and State of Pennsylvania, have invented certain new and useful Improvements in Primary Batteries; and I do hereby declare the following to be a full, clear, and exact description of the invention, such as will enable others skilled in the art to which it appertains to make and use the same.

This invention relates to improvements in primary batteries.

The object of the invention is to accomplish constancy, and in the present invention I have produced a thoroughly-depolarized battery.

The construction and arrangement are clearly indicated in the accompanying drawings, in which—

Figure 1:
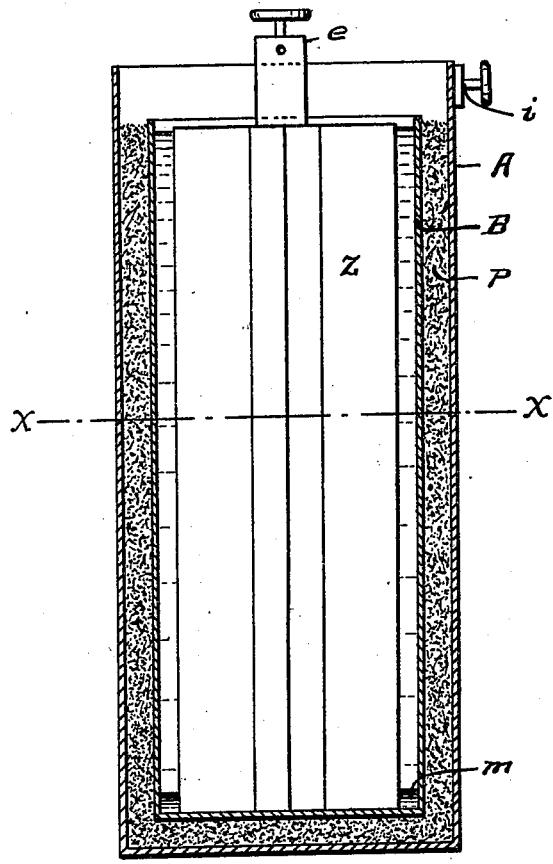
Figure 2:
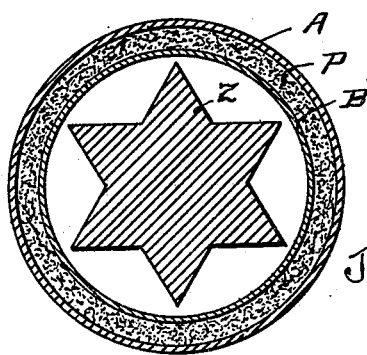

Figure 1 is a vertical sectional view of my battery. Fig. 2 is a cross-sectional view on line $x\ x$ of Fig. 1.

The casing or jar A is of lead and is open at its top. A receptacle B is located inside of this casing and is sufficiently smaller in diameter than the casing to allow a considerable space all around it. This receptacle is made of a porous inert material—as, for instance, cardboard. A zinc Z is located in this receptacle B and extends its full height. This zinc has a corrugated surface, so as to expose a great portion thereof to the electrolyte. In the space P, between the casing A and receptacle B, I place pulverized lead chlorid.

Inside the receptacle B, I place a small quantity of mercury $m$ for the purpose of amalgamation.

Around the zinc, inside the porous receptacle B, I place the electrolyte, which is a solution of hydrochloric acid or any chlorid of an element whose oxid unites with water to form a hydrate. On top of this substance I place a sufficient quantity of paraffin-oil or equivalent material to prevent evaporation.

My object is to produce constancy in a primary battery, and I accomplish this result with the arrangement just described.

In my present battery the hydrogen, which is the cause of all polarization, is prevented from forming on the inner surface of the lead casing A by the lead chlorid, as explained by the following action, viz: As the chlorin of the hydrochloric acid unites with the zinc to form zinc chlorid and the hydrogen is liberated at the surface of the lead casing A the chlorin of the lead chlorid unites with the hydrogen to re-form hydrochloric acid and the remaining lead of the lead chlorid is deposited on the surface of the lead-casing A. The result of this action must of necessity be a thorough depolarization, and consequently a constant battery.

One wire is connected to the zinc Z at a point $c$ and the other to the casing A at a point $i$.

Having thus fully described my invention, what I claim, and desire to secure by Letters Patent, is—

A primary battery comprising a lead casing or jar having an open top, and a porous receptacle B having an open top, located in said casing, with a quantity of pulverized lead chlorid between said casing and receptacle, a corrugated zinc Z, located in said receptacle and surrounded by a solution composed of hydrochloric acid and a chlorid of an element whose oxid unites with water to form a hydrate, a quantity of paraffin-oil covering said substance and a quantity of mercury resting on the bottom of said receptacle B in contact with the zinc, all substantially as and for the purpose specified.

In testimony whereof I affix my signature in presence of two witnesses.

JOHN W. FREES.

Witnesses:
ED. A. KELLY,
E. P. VAN REED.